United States Patent [19]
Chartet

[11] 3,960,210
[45] June 1, 1976

[54] DEVICE FOR FIXING TUBE PLATES AND LATERAL FLANGES OF HEAT EXCHANGERS

[75] Inventor: André Chartet, Meudon, France

[73] Assignee: Societe Anonyme des Usines Chausson, Asnieres, France

[22] Filed: Apr. 30, 1973

[21] Appl. No.: 355,438

[30] Foreign Application Priority Data
May 4, 1972  France .............................. 72.15961

[52] U.S. Cl. .................................. 165/149; 165/81
[51] Int. Cl.² ........................................... F28D 1/00
[58] Field of Search .......... 217/85; 29/488, 157.3 R, 29/157.3 V; 228/44; 165/149, 81

[56] References Cited
UNITED STATES PATENTS

| | | | |
|---|---|---|---|
| 1,357,597 | 11/1920 | Springer | 165/149 |
| 1,593,245 | 7/1926 | Cutler | 165/149 X |
| 1,695,519 | 12/1928 | Young | 165/149 |
| 1,701,664 | 2/1929 | Cooper | 165/149 X |
| 1,834,001 | 12/1931 | Modine | 165/81 X |
| 2,933,291 | 4/1960 | Huggins | 165/149 X |
| 3,472,316 | 10/1969 | Couch, Jr. | 165/149 X |
| 3,627,035 | 12/1971 | Astrup | 165/149 X |
| 3,726,466 | 4/1973 | Vedder et al. | 228/44 |

FOREIGN PATENTS OR APPLICATIONS

| | | | |
|---|---|---|---|
| 1,348,209 | 11/1963 | France | 165/81 |
| 1,272,995 | 10/1961 | France | 165/149 |

*Primary Examiner*—Charles J. Myhre
*Assistant Examiner*—William C. Anderson
*Attorney, Agent, or Firm*—Imirie, Smiley & Linn

[57] ABSTRACT

The flanges of the heat-exchanger comprise at two ends thereof lugs or connecting members delimiting a transverse fold extended by a tongue up to the tube plates. The ends of the tubes are positioned in the tube plates and the tongue is fixed to the tube plate. The assembled heat exchanger is then submitted to brazing.

11 Claims, 4 Drawing Figures

U.S. Patent   June 1, 1976   3,960,210
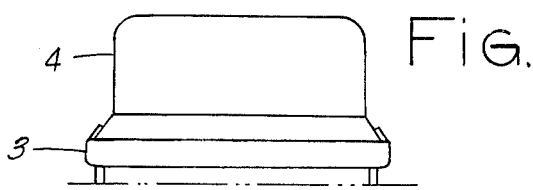
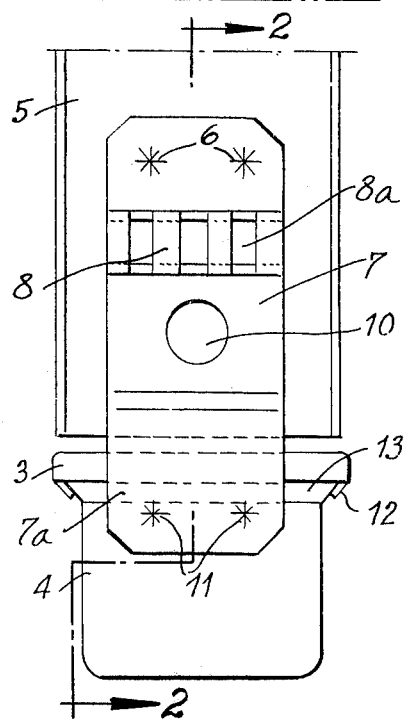
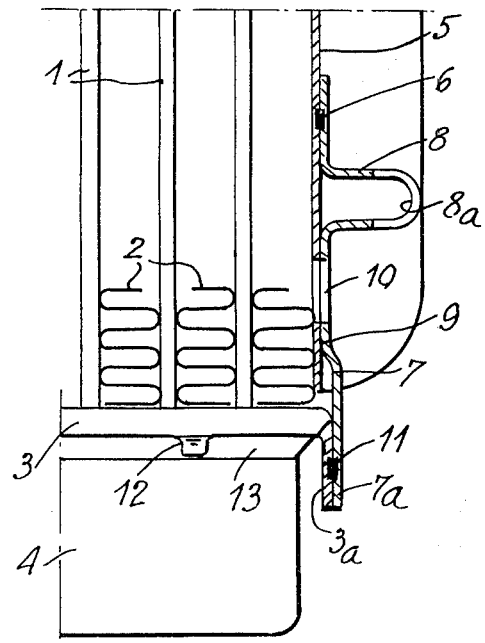
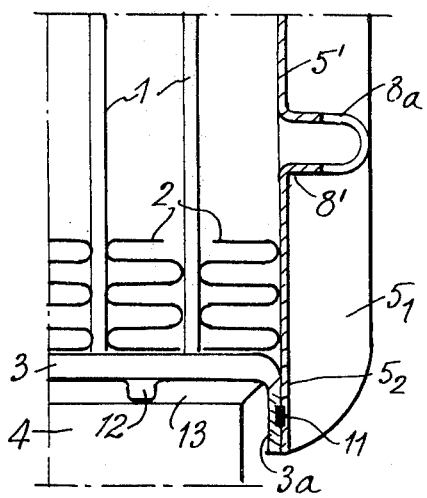
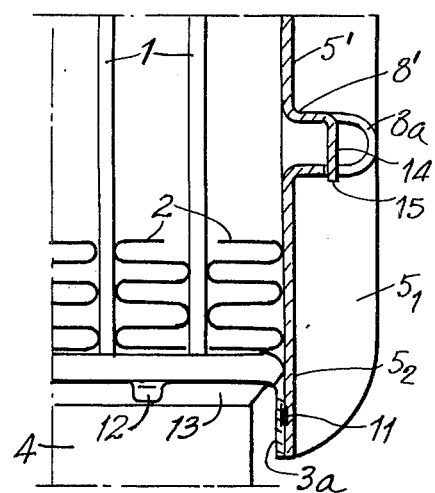

DEVICE FOR FIXING TUBE PLATES AND LATERAL FLANGES OF HEAT EXCHANGERS

BACKGROUND OF THE INVENTION

Upon brazing in a single step a tubular heat exchanger core, i.e. the circulation tubes, the dissipators or fins connected to said tubes, the tube-plates in which the ends of the tubes are fitted, the header-tanks covering the tube-plates and the lateral flanges extending on each side of the core, it is necessary to hold all the parts of the heat exchanger core under a slight pressure applied on the two header-tanks tending thus to make them come slightly nearer. The pressure must be sufficient to hold the parts together but not sufficient to cause permanent distortions thereof.

In addition, care must be taken that the expansion to which the heat exchanger is submitted, when at the brazing temperature, does not cause a permanent distortion of some parts, e.g. the tubes or the lateral flanges, said parts being respectively submitted to a differential heat expansion.

Furthermore, the connection between the tube plates and the lateral flanges must be sufficiently strong to withstand the various stresses as much as possible, when the finished heat exchanger is utilized, for example on a vehicle. Actually, this prevents noticeable mechanical stresses to be exerted on the tubes, the dissipators and the tubes and tube plates junctions which constitute the most fragile parts of a heat exchanger.

The above considerations apply to any metals or alloys utilized for making heat exchanger parts, but are of the primary importance when said parts are made of aluminium or of aluminium alloy because the brazing of said parts is performed at a high temperature, about 600°C which is a temperature to which the expansion of the parts reaches significant values and to which, besides, the aluminum has poor mechanical strength as said temperature is very close to the melting temperature of aluminium.

SUMMARY OF THE INVENTION

According to the invention, a brazed tubular heat exchanger core having tubes, tube plates and lateral flanges and comprising tubes having their respective ends inserted through said tube plates, is manufactured with at least one distortable portion provided on said lateral flanges between said tube plates, with said distortable portion rigidly connected to said tube plate.

BRIEF DESCRIPTION OF THE DRAWING

FIG. 1 is a fragmentary elevational side view of a portion of a heat exchanger according to the invention;

FIG. 2 is a fragmentary partially sectional view taken on line 2—2 of FIG. 1;

FIGS. 3 and 4 are fragmentary views illustrating a modification.

DETAILED DESCRIPTION OF THE INVENTION

Referring specifically to FIGS. 1 and 2, the tubes 1 of the heat exchanger, between which the fins or dissipators 2 are engaged, have their ends, inserted through tube plates 3, the top plate being illustrated diamagratically in FIG. 1. It should be understood that the top plate assembly may be identical or similar to the bottom plate assembly, as illustrated. The tube plates 3 are covered by header-tanks 4 which are connected together along their narrower sides by means of lateral flanges 5. The flanges 5 can be U-shaped to increase their mechanical strength, and can be used as supporting elements for the complete heat exchanger.

For fixing the flanges and the tube plates, lugs 7 are for example fixed by spot welds 6 on the flanges. Lugs 7 are shaped to delimit at least one fold 8, said fold being lyriform or similar U-shape, and each of the lugs is provided at its free end with an extension 7a which is secured by spot welds 11 to lugs 3a extending from the narrower sides of the tube plates 3.

The fold 8 or each of the folds 8 — if there are more than one — is advantageously, as shown in the drawing, provided with notches 8a thus causing the lugs 7 to be very flexible at the level of each fold and thus can easily be axially distorted. The portion of the lugs 7 extending between the fold 8 and the tube plate 3 has a portion 9 that bears on the corresponding end of the flange 5. Besides, one or more holes 10 are, preferably, provided both in the lug 7 and in the flange 5.

To assemble and braze the heat exchanger the method is as follows:

After assembling the tubes 1 with the dissipators 2, the tubes are engaged into two tube plates 3, then the flanges 5, provided with lugs 7 at each of their ends, are positioned. The ends 7a of the lugs 7 are afterwards fixed to the lugs 3a of the tube plates by means of spot welds 11, which provides the mechanical connection between the flanges and the tube plates which are thus braced by said flanges 5 and said lugs 7, while preventing said tube plates from movement with respect to the tubes 1.

Lastly, the header-tanks 4 are assembled with and connected to the tube plates by any suitable means, such as by means of small lugs 12 which are on an edge 13 of the header tanks.

The entirely assembled heat exchanger of which all the elements are mechanically connected together as described in the above disclosure is then fluxed and afterwards is submitted to a brazing process, which means that it is heated to the temperature which melts the brazing alloy covering all or portions of the parts constituting the heat exchanger.

During the step of heating to the melting temperature of the brazing alloy, the tubes 1 can expand in a manner different to that of the flanges 5 but said differential expansion is compensated by the fold or folds 8 which are distorted without causing prejudicial stresses to be exerted at the intersection of the ends of tubes with the tube plates, stresses which would cause buckling of the tubes 1 or, disengagement thereof from the tube plates.

The heat exchanger is then cooled, so that the brazing alloy becomes solid and provides the connection of all the parts of the heat exchanger. During cooling of the brazing alloy, the lugs 7 are also brazed along the portion 9, thus a rigid connection is established between the lugs 7 and the tube plate beyond the fold 8.

The holes 10 facilitate washing of the heat exchanger if required to remove any the traces of flux which could have remained adhered thereto after the brazing process and, besides, said holes enable ready inspection to determine that a suitable brazing has been made at the level of the portion 9. The holes 10 also constitute assembling marks for determining the distance between the tube plates, and they also enable observation of any distortion which can have occurred during the differential expansions.

It appears from the foregoing that the folds 8 essentially are used to compensate the differential expansions which could occur between the flanges and the tubes during the brazing process, said folds thus constituting a rigid connection between the flanges and the tubes plates.

In the modifications of FIGS. 3 and 4, the lugs 7 are eliminated and the flanges s' embody a fold 8' with notches 8a. In this case, the edges 5₁ of the flanges are completely cut at the level of the fold or of the folds 8' in order that the flange be possibly axially distorted when its end 5₂ is fixed by means of spot welds 11 on the lugs 3a of the tube plates 3.

In the embodiment shown in FIG. 3, after the brazing step has been performed, the assembly of each flange 5' is brazed to the dissipator 2 which bears against the flange and, consequently, the dissipator increases the mechanical strength of the whole assembly to compensate for the relative weakness of fold 8'.

In the modification according to FIG. 4 the portions of the folds 8', which are cut to form the notches 8a, are utilized to form lugs 14 folded in the bottom of said notches 8a to enable the end 15 of said lugs 14 to be more or less resiliently pressed against the opposite bottom of the notch.

Thus, the differential expansions are compensated as in the other embodiments, but when proceeding to the brazing step, the end 15 of the lugs 14 also is brazed which provides the continuity of the flanges 5' and their axial reinforcement.

The invention is not restricted to the embodiment shown and described in detail since various modifications thereof can moreover be applied to it without departing from the scope of the invention as defined in the appended claims.

I claim:

1. A heat exchanger core comprising a plurality of spaced substantially parallel tubes, two tube plates respectively secured to opposite ends of said tubes, and lateral flanges for mutual connection of said tube plates, said lateral flanges having movable end portions connected therewith through distortable substantially U-shaped members having a plurality of cuts extending longitudinally therethrough, said movable end portions being rigidly connected to said tube plates whereby said distortable members compensate through distortion thereof for differential heat expansion occurring between said tubes and said lateral flanges during brazing.

2. The core set forth in claim 1, wherein the distortable members comprise independent parts, fixed at one end thereof to the lateral flanges and at the other end thereof to the tube plates.

3. The core set forth in claim 1, wherein the distortable elements are integral with said lateral flanges.

4. The core set forth in claim 1, wherein the distortable members have a bearing portion extending toward the tube plate and joined to the end portion of the flange during said brazing, thereby eliminating distortion of said distortable member.

5. The core set forth in claim 1, wherein each distortable member has a first hole and the lateral flanges have a second hole, said first and second holes registering together when the core is at ambient temperature, whereby the heat expansion may be visualized by the relative displacement of the two holes.

6. The core set forth in claim 1, wherein the tube plates have small lugs engaging a bearing edge of header tanks covering said tube plates and securing said header tanks to the tube plates.

7. The core set forth in claim 1, wherein the distortable member is integral with said lateral flange, the end of said member beyond the lateral flange being directly fixed to the tube plate.

8. The core set forth in claim 1, wherein the distortable member is provided with longitudinal notches, whereby flexibility of the member is increased.

9. The core set forth in claim 8, wherein the distortable members are fixed to the lateral flanges and to the tube plates by spot welds.

10. The core set forth in claim 8, wherein metal cut in the distortable member to define the notches constitutes a lug joined to bottom of the U-shaped part of the distortable member to be fixed to the lateral flange.

11. A heat exchanger core comprising a plurality of spaced substantially parallel tubes, two tube plates respectively secured to opposite ends of said tubes, and lateral flanges for mutual connection of said tube plates, said lateral flanges having end portions connected to said tube plates through distortable substantially U-shaped members whereby said distortable members compensate through distortion thereof for differential heat expansion occurring between said tubes and said lateral flanges during brazing, said distortable members being attached to adjacent members by said brazing so as to render the same rigid whereby said end portions are rigidly connected to said tube plates in the completed assembly.

* * * * *